(12) United States Patent
Chen

(10) Patent No.: US 9,184,663 B2
(45) Date of Patent: Nov. 10, 2015

(54) SWITCHING POWER SUPPLY DEVICE

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD. (JP)

( * ) Notice: Subject to any disclaimer, the term of this patent is extended or adjusted under 35 U.S.C. 154(b) by 237 days.

(21) Appl. No.: 13/940,471

(22) Filed: Jul. 12, 2013

(65) Prior Publication Data

US 2014/0016364 A1   Jan. 16, 2014

(30) Foreign Application Priority Data

Jul. 13, 2012   (JP) .................................. 2012-157052

(51) Int. Cl.
*H02M 3/335* (2006.01)
*H02M 1/42* (2007.01)
*H02M 1/00* (2007.01)

(52) U.S. Cl.
CPC ........ *H02M 3/33507* (2013.01); *H02M 1/4225* (2013.01); *H02M 3/33515* (2013.01); *H02M 2001/007* (2013.01); *H02M 2001/0032* (2013.01); *Y02B 70/126* (2013.01); *Y02B 70/1433* (2013.01); *Y02B 70/16* (2013.01)

(58) Field of Classification Search
USPC ....................... 363/21.12, 89, 90, 97; 323/207
See application file for complete search history.

(56) References Cited

U.S. PATENT DOCUMENTS

| 8,194,419 B2 * | 6/2012 | Ryu et al. | .................... 363/21.04 |
| 2007/0145956 A1 * | 6/2007 | Takeuchi | ...................... 323/207 |

FOREIGN PATENT DOCUMENTS

| JP | 2007-288855 A | 11/2007 |
| JP | 2010-220330 A | 9/2010 |
| JP | 2011-015570 A | 1/2011 |

* cited by examiner

*Primary Examiner* — Nguyen Tran
(74) *Attorney, Agent, or Firm* — Rossi, Kimms & McDowell LLP

(57) ABSTRACT

In some aspects of the invention, a load state detecting circuit is configured so that a threshold voltage for determining the size of a load of a DC-DC converter is set in the load state detecting circuit based on a maximum value of an output voltage of a power factor correction converter in an operation-stopped state of the power factor correction converter, so that the load state detecting circuit outputs an operation-enable signal when a feedback voltage indicating the size of the load of the DC-DC converter exceeds the threshold voltage. Thus, by way of some aspects of the invention, it is possible to provide a switching power supply device which can control enabling and stopping operation of a power factor correction converter reliably in accordance with a load state of a DC-DC converter obtaining a predetermined DC output voltage by switching an output voltage of the correction converter.

6 Claims, 9 Drawing Sheets

SWITCHING POWER SUPPLY DEVICE

BACKGROUND OF THE INVENTION

1. Field of the Invention

Embodiments of the invention relate to switching power supply devices.

2. Description of the Related Art

To secure stability and safety of a commercial power system, a switching power supply device which consumes power higher than 75 W is typically obligated to make power factor correction. Therefore, there has been recently proposed a switching power supply device equipped with a small-sized and highly efficient power factor correction converter (PFC) and a DC-DC converter which converts a DC voltage obtained from the power factor correction converter into a DC output voltage in accordance with specifications of a load (see, for example, Japanese patent publication no. JP-A-2007-288855). A quasi-resonant converter (QR) low in load imposed on a secondary-side rectifier diode is often used as this type DC-DC converter when the rated load is about 100 W.

FIG. 6 is a diagram of schematic configuration of a switching power supply device 1 equipped with a power factor correction converter 2 and a DC-DC converter (quasi-resonant converter) 3. In FIG. 6, the reference numeral 4 designates a rectifier circuit which rectifies AC power fed from a commercial power supply 5 and inputs the rectified AC power to the power factor correction converter 2, and the reference numeral 6 designates a noise filter which is interposed between the rectifier circuit 4 and the commercial power supply 5.

The power factor correction converter 2 schematically has an inductor L1 which is connected to the rectifier circuit 4, a switching element Q1 which forms a current path through the inductor L1 between the switching element Q1 and the rectifier circuit 4 when the switching element Q1 is on, and a diode D1 which forms a current path between the inductor L1 and an output capacitor C2 when the switching element Q1 is off. A control circuit IC1 controls a current flowing in the inductor L1 by driving the switching element Q1 on/off to thereby obtain a stabilized DC voltage Vb.

The reference signs R1 and R2 designate resistors which divide and detect the DC voltage Vb obtained by the output capacitor C2 and feed the detected DC voltage Vb back to the control circuit IC1. The reference sign R3 designates a shunt resistor for detecting a current (load current) flowing through the switching power supply device 1. Operation of the thus configured power factor correction converter 2 and effects and functions thereof have been introduced in detail, as in, for example, Japanese patent publication no. JP-A-2010-220330 etc.

The DC-DC converter (quasi-resonant converter) 3 schematically has a switching element Q2 which is connected in series with a primary winding P1 of an isolation transformer T to which the output (DC voltage Vb) of the power factor correction converter 2 is applied, a resonant capacitor C4 which is provided in parallel with the switching element Q2, and an output capacitor C5 which is connected to a secondary winding S1 of the isolation transformer T through a rectifier diode D2. A control circuit IC2 generates quasi-resonance between leakage inductance of the isolation transformer T and the resonant capacitor C4 by driving the switching element Q2 on/off to thereby generate a predetermined DC output voltage Vo.

The reference signs R5 and R6 designate resistors which divide and detect a DC output voltage Vo obtained by the output capacitor C5 and feed the detected DC output voltage Vo back to the control circuit IC2 through a feedback circuit FB. The reference sign R4 designates a shunt resistor for detecting a current flowing in the switching element Q2. The DC-DC converter 3 is configured to detect a ZCD voltage generated at an auxiliary winding P2 of the isolation transformer T to thereby control turn-on timing of the switching element Q2. Operation of the thus configured DC-DC converter (quasi-resonant converter) 3 and effects and functions thereof have been introduced in detail, as in, for example, Japanese patent publication no. JP-A-2011-15570 etc.

Incidentally, a load state detecting circuit 7 which detects a load state and outputs an operation-enable signal EN for the power factor correction converter 2 to enable or stop operation of the power factor correction converter 2 is provided in the DC-DC converter 3. An operation control circuit 8 which enables or stops operation of the power factor correction converter 2 in accordance with the operation-enable signal EN is provided in the power factor correction converter 2. The load state detecting circuit 7 eliminates the loss in the power factor correction converter 2 by stopping operation (working) of the power factor correction converter 2, for example, at a light load state in which the input electric power is lower than 75 W. In this manner, the load state detecting circuit 7 plays a role of improving the conversion efficiency of the power factor correction converter 2.

Such a load state detecting circuit 7 is configured, for example, as shown in FIG. 7 and is embedded in the control circuit IC2. The load state detecting circuit 7 has a comparator (light load detecting circuit) 7b which sets a flip-flop 7a by determining that the state is a light load state when the feedback voltage FB used for the on/off control of the switching element Q2 in the DC-DC converter 3 is lower than a preset first threshold voltage Vref1, and a comparator (normal load detecting circuit) 7c which resets the flip-flop 7a by determining that the state is a normal load state when the feedback voltage FB is larger than a second threshold voltage Vref2 (>Vref1) which will be described later. The output of the flip-flop 7a is delayed by means of a delay circuit 7d using charging/discharging of a capacitor Ct to make control to set/reset a flip-flop 7e. Thus, the operation-enable signal EN is obtained as a set output of the flip-flop 7e.

The delay circuit 7d has the capacitor Ct charged by a constant current source It, and a switching element S which is provided in parallel with the capacitor Ct. When the output of the flip-flop 7a is [H], the switching element S is operated to be off (shut off) so that the capacitor Ct is charged. When the output of the flip-flop 7a is [L], the switching element S is operated to be on (conductive) so that electric charge stored in the capacitor Ct is discharged through a resistor Rt. The delay circuit 7d further has a comparator 7f which resets the flip-flop 7e when a charged voltage Vd of the capacitor Ct is higher than a reference voltage Vth2, and a comparator 7g which sets the flip-flop 7e when the charged voltage Vd is lower than a reference voltage Vth1.

Operation of the load state detecting circuit 7 configured thus will be described briefly as follows. When a load Po becomes light so that the feedback voltage FB decreases accordingly to be lower than the first threshold voltage Vref1 as in a waveform diagram of the operation of the load state detecting circuit 7 shown in FIG. 8, the flip-flop 7a is set. Then, the switching element S of the delay circuit 7d is turned off due to the setting of the flip-flop 7a so that the capacitor Ct is charged with charging characteristic determined based on the capacitance of the capacitor Ct and a constant current fed from the constant current source It. When the charged voltage Vd of the capacitor Ct is higher than the reference voltage Vth2 after the passage of a predetermined time Td-off, the flip-flop 7e is reset so that the operation-enable signal EN turns to [L] to thereby make control to stop the operation of the power factor correction converter 2.

When the operation (working) of the power factor correction converter 2 is stopped in this manner, the output voltage Vb of the power factor correction converter 2 is reduced gradually and then settled down to a voltage determined based on an AC voltage Vac applied from the commercial power supply 5. The output voltage Vb of the power factor correction converter 2 on this occasion changes periodically in a cycle based on rectification of the AC voltage Vac and with a change width determined based on the size of the load Po and the capacitance of the output capacitor C1.

When the load Po becomes heavy in a state where operation of the power factor correction converter 2 is stopped, the feedback voltage FB in the DC-DC converter 3 becomes high in accordance with the size of the load Po. When the feedback voltage FB is higher than the second threshold voltage Vref2, the flip-flop 7a is reset so that electric charge stored in the capacitor Ct of the delay circuit 7d is discharged. When the charged voltage Vd of the capacitor Ct is lower than the reference voltage Vth1 after the passage of a predetermined time Td-on, the flip-flop 7e is set so that the operation-enable signal EN turns to [H]. As a result, operation of the power factor correction converter 2 is enabled so that working of the power factor correction converter 2 is restarted.

In a state where operation of the power factor correction converter 2 is stopped, the DC voltage Vb obtained by the output capacitor C2 of the power factor correction converter 2 changes periodically with a change width determined based on the size of the load Po and the capacitance of the output capacitor C1 as described above. Therefore, because attention has been heretofore entirely paid to the fact that a bottom voltage Vb-min of the DC voltage Vb changes dependently on the size of the load Po, the second threshold voltage Vref2 to be compared with the feedback voltage FB has been set based on the minimum value (bottom voltage Vb-min) of the DC voltage Vb.

However, when the AC voltage Vac is lower than a defined voltage (for example, 100 V) or when the capacitance of the output capacitor C1 is low, the feedback voltage FB increases as the aforementioned DC voltage Vb decreases even if there is no change in the size of the load Po. Then, there may arise a situation that the feedback voltage FB exceeds the second threshold voltage Vref2 set based on the minimum value (bottom voltage Vb-min) of the DC voltage Vb as described above and this situation may be detected as an increase of the load Po by mistake. For this reason, there is a problem that the increase of the feedback voltage FB caused by the increase of the load Po cannot be detected reliably.

As shown in FIG. 9, for explaining the relation between the feedback voltage FB and the DC voltage Vb depending on the AC voltage Vac when, for example, the load Po is 30 W (fixed), the feedback voltage FB increases as the DC voltage Vb decreases. When, for example, the output voltage Vb decreases to be not higher than about 85 Vdc, the feedback voltage FB always exceeds the second threshold voltage Vref2 set as described above though the load Po is fixed to a light load state as shown in FIG. 9.

Then, the comparator 7c detects this state, resets the flip-flop 7a, and sets the flip-flop 7e as described above, so that the operation-enable signal EN turns to [H]. As a result, the power factor correction converter 2 shifts to an operating state in accordance with the operation-enable signal EN even if there is no change in the size of the load Po. In other words, when the DC voltage Vb decreases with the decrease of the AC voltage Vac, there arises such a disadvantage that it is impossible to make the originally intended control in such a manner that the increase of the load Po is detected in an operation-stopped state of the power factor correction converter 2 to thereby restart operation of the power factor correction converter 2. Thus, as described above, there is a need in the art for an improved switching power supply device.

SUMMARY OF THE INVENTION

Embodiments of the invention address this and other needs. Embodiments of the invention provide a switching power supply device that can control operation of a power factor correction converter reliably in accordance with a load state without enabling any unintended operation of the power factor correction converter in a light load state even when an AC voltage decreases, so that improvement in conversion efficiency of the power factor correction converter can be achieved.

In some embodiments, there is provided a switching power supply device including: a power factor correction converter which obtains a DC voltage by switching an input AC voltage; a DC-DC converter which is, for example, made of a quasi-resonant converter and which obtains a predetermined DC output voltage Vo by switching an output voltage Vb of the power factor correction converter; and a load state detecting circuit which outputs an operation-enable signal EN for the power factor correction converter in accordance with a load state of the DC-DC converter to thereby enable or stop operation of the power factor correction converter; wherein: the load state detecting circuit is configured so that a threshold for determining the size of a load of the DC-DC converter is set in the load state detecting circuit based on a maximum value Vb-max of the output voltage Vb of the power factor correction converter in an operation-stopped state of the power factor correction converter so that the load state detecting circuit outputs the operation-enable signal EN when a signal indicating the size of the load of the DC-DC converter exceeds the threshold.

In some embodiments, the load state detecting circuit includes a voltage detecting unit which detects the maximum value of the output voltage of the power factor correction converter in the operation-stopped state of the power factor correction converter, and configuration is made to set a threshold for determining the size of the load of the DC-DC converter in accordance with the maximum value of the output voltage detected by the voltage detecting unit. Specifically, the threshold is set as a threshold voltage to be compared with a feedback voltage FB used for controlling the DC output voltage in the DC-DC converter, or as a threshold voltage to be compared with a periodic voltage Vsw proportional to a time width Tonoff of an on/off drive cycle of a switching element in the DC-DC converter.

In addition, in some embodiments, the load state detecting circuit includes: a flip-flop which outputs the operation-enable signal EN, for example, at a reset time; a light load detecting circuit which sets the flip-flop when the feedback voltage FB of the DC-DC converter is lower than a preset first threshold voltage Vref1; and a normal load detecting circuit which resets the flip-flop when a fixed time (e.g. time substantially equal to or longer than a half period of AC power) Tdelay has passed after the feedback voltage FB exceeds the second threshold voltage Vref2 which is higher than the first threshold voltage Vref1 and which is set based on the maximum value Vb-max of the output voltage Vb of the power factor correction converter.

Alternatively, in some embodiments, the load state detecting circuit includes: a flip-flop which outputs the operation-enable signal EN, for example, at a reset time; a light load detecting circuit which sets the flip-flop when the periodic voltage Vsw of the DC-DC converter is lower than a preset first threshold voltage Vref1; and a normal load detecting circuit which resets the flip-flop when a fixed time (e.g. time substantially equal to or longer than a half period of AC power) Tdelay has passed after the periodic voltage Vsw exceeds the second threshold voltage Vref2 which is higher than the first threshold voltage Vref1 and which is set based on the maximum value Vb-max of the output voltage Vb of the power factor correction converter.

According to embodiments of the switching power supply device configured thus, the second threshold voltage Vref2 for detecting the increase of a load Po in an operation-stopped state of the power factor correction converter is set based on the maximum value Vb-max of the output voltage Vb of the power factor correction converter in the operation-stopped state of the power factor correction converter. The maximum value Vb-max of the output voltage Vb of the power factor correction converter depends only on the value of the AC voltage Vac regardless of the capacitance of the output capacitor of the power factor correction converter and the change in the load Po of the DC-DC converter.

Accordingly, in some embodiments, even when the feedback voltage FB increases as the output voltage Vb decreases, the second threshold voltage Vref2 to be compared with the feedback voltage FB is set in accordance with the decrease of the output voltage Vb so that the increase of the feedback voltage FB caused by the decrease of the output voltage Vb is prevented from being detected as an increase of the load Po by mistake. Only the increase of the feedback voltage FB caused by the increase of the load Po can be detected reliably.

In some embodiments, even when the second threshold voltage Vref2 to be compared with the periodic voltage Vsw proportional to the time width Tonoff of the on/off drive cycle of the switching element in the DC-DC converter is set, the increase of the periodic voltage Vsw caused by the decrease of the output voltage Vb can be likewise prevented from being detected as an increase of the load Po by mistake. Only the increase of the periodic voltage Vsw caused by the increase of the load Po can be detected reliably.

Accordingly, by way of some embodiments, it is possible to prevent occurrence of such a situation that the feedback voltage FB or the periodic voltage Vsw is higher than the second threshold voltage Vref2 due to the decrease of the output voltage Vb with the decrease of the AC voltage Vac in a fixed light load state as in the case where the second threshold voltage Vref2 is set with reference to the minimum value (bottom voltage Vb-min) of the output voltage Vb. Therefore, even when the AC voltage Vac decreases, operation (stopping and working) of the power factor correction converter can be controlled reliably in accordance with the load state so that improvement in the conversion efficiency of the power factor correction converter can be achieved.

DETAILED DESCRIPTION

A switching power supply device according to embodiments of the invention is described below with reference to the drawings.

In accordance with some embodiments of the invention, the switching power supply device 1 has a power factor correction converter 2, a DC-DC converter 3 which obtains a predetermined DC output voltage Vo by switching an output voltage Vb of the power factor correction converter 2, and a load state detecting circuit 7 which outputs an operation-enable signal EN for the power factor correction converter 2 in accordance with the load state of the DC-DC converter 3 to make control to enable or stop operation of the power factor correction converter 2. The switching power supply device 1 is fundamentally configured in the same manner as the aforementioned background-art switching power supply device 1 shown in FIG. 6.

Figure 1:
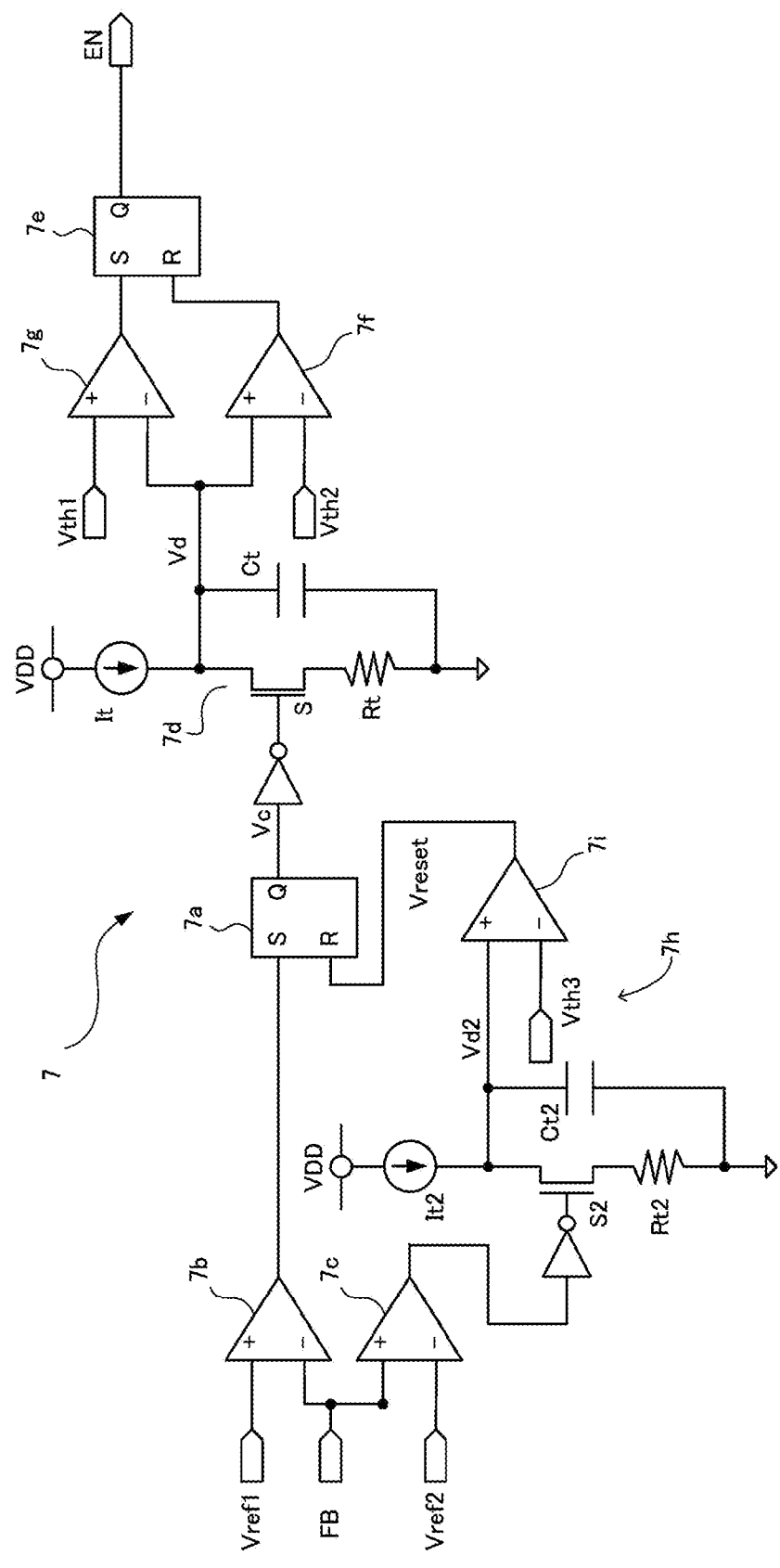
FIG. 1 is a diagram showing configuration of a load state detecting circuit which is a characteristic constituent part of a switching power supply device according to an embodiment of the invention.
Figure 7:
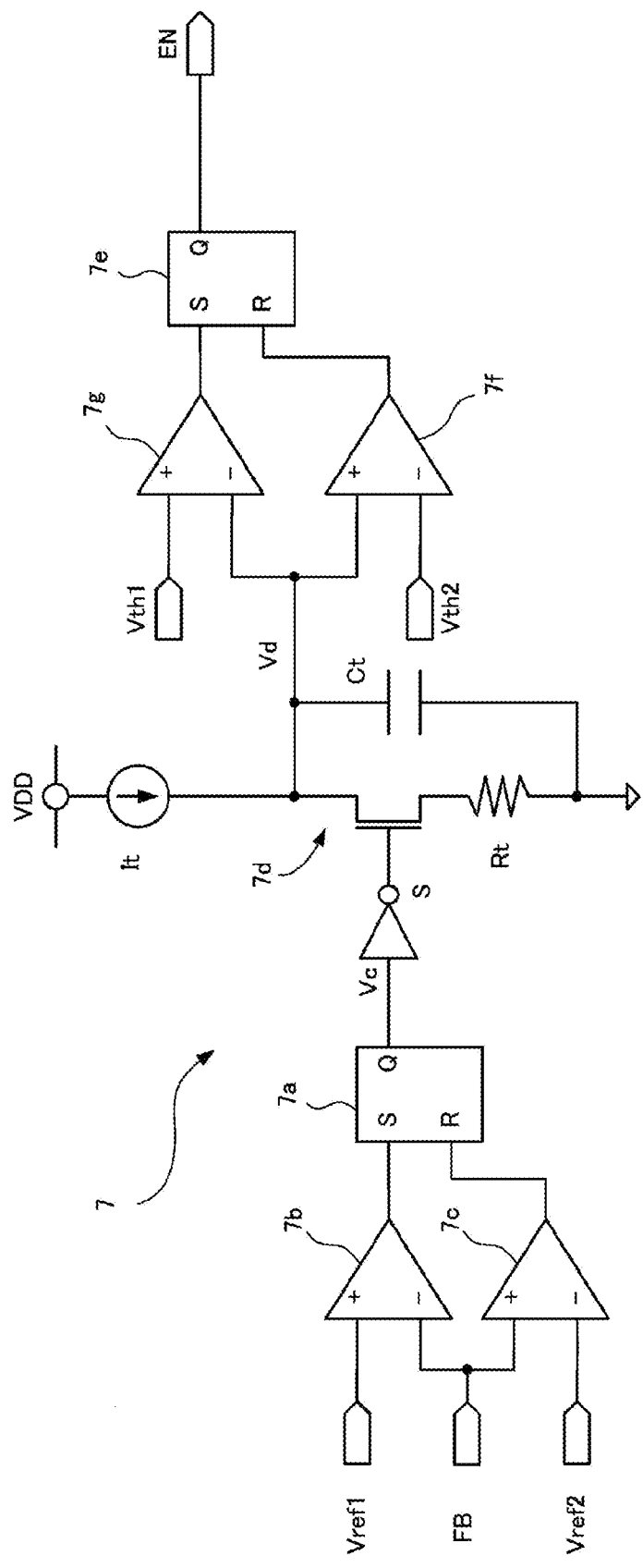
FIG. 7 is a diagram showing an example of configuration of a load state detecting circuit provided in the DC-DC converter.
Figure 8:
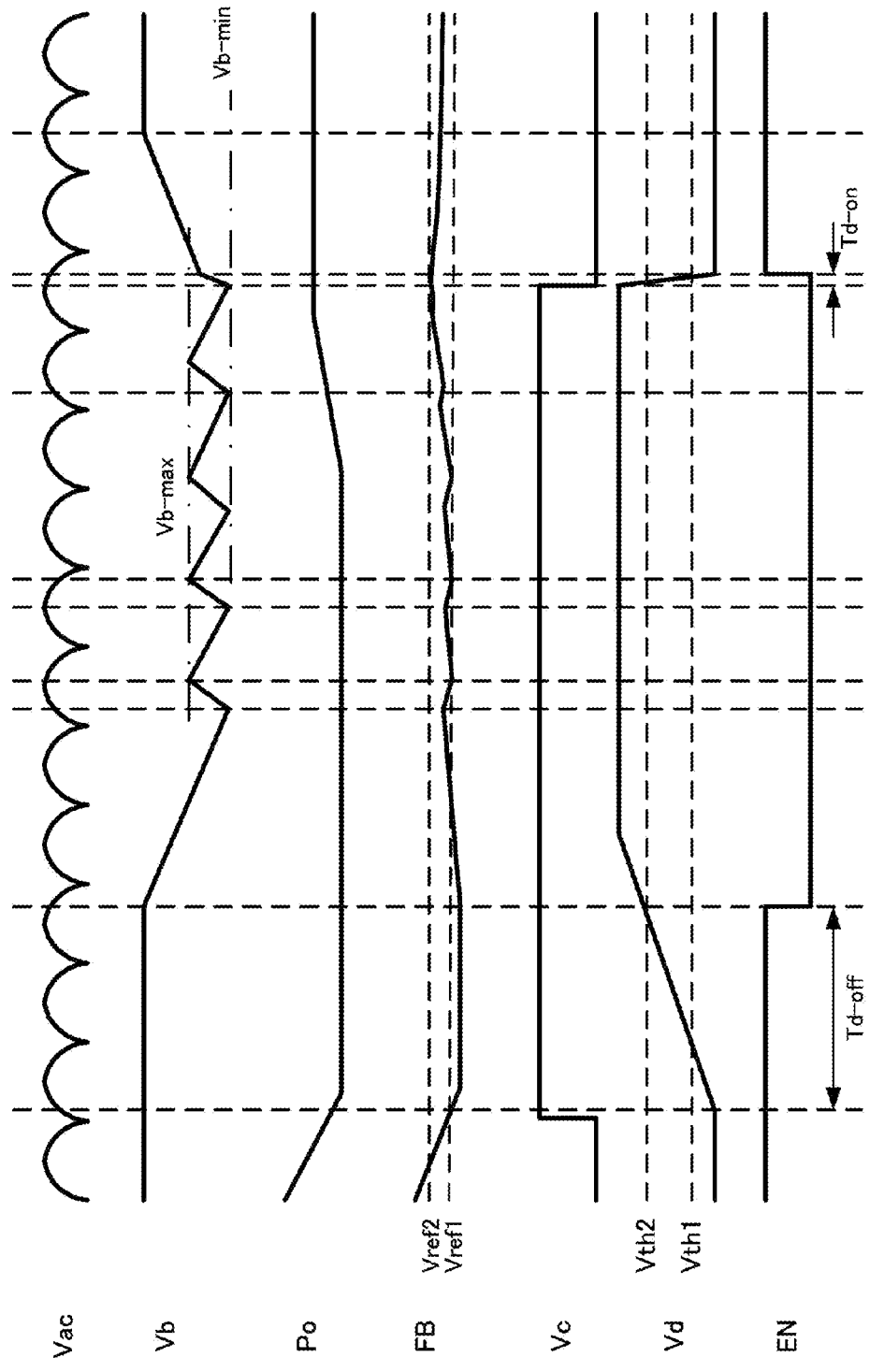
FIG. 8 is an operation waveform graph for explaining operation of the load state detecting circuit shown in FIG. 7 and effects thereof.
Figure 9:
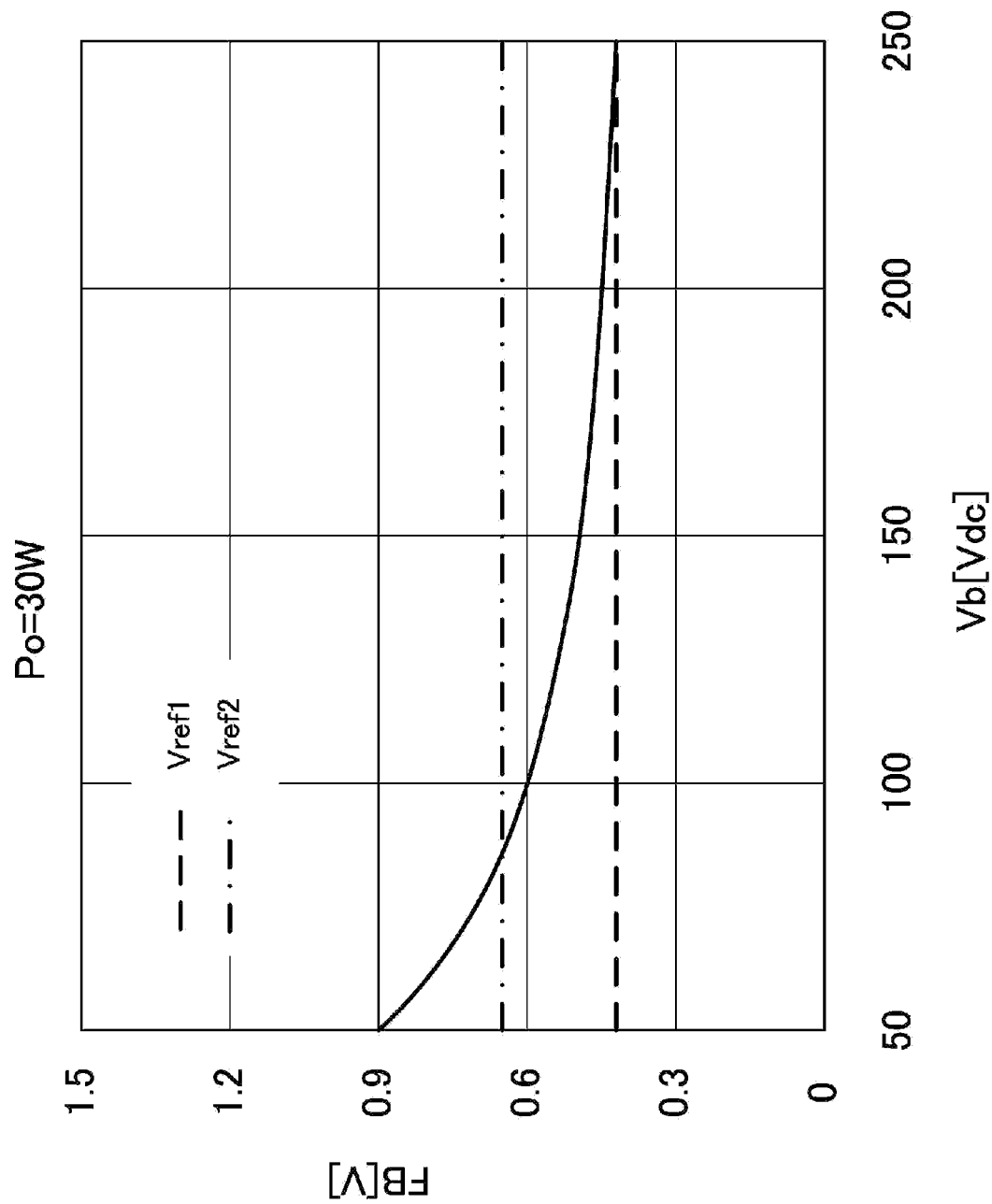
FIG. 9 is a graph showing the relation between a DC voltage Vb and a feedback voltage FB in a fixed load condition.

FIG. 1 is a diagram of schematic configuration of the load state detecting circuit 7 embedded in the DC-DC converter (quasi-resonant converter) 3 which is a characteristic part of embodiments of the invention in the switching power supply device 1 according to the invention. The load state detecting circuit 7 is formed as a circuit which plays the same role as the aforementioned background-art load state detecting circuit 7 shown in FIG. 7 except that the second threshold voltage Vref2 set in the comparator 7c is determined based on a maximum value (peak voltage Vb-max) of the output voltage Vb of the power factor correction converter 2 and the output of the comparator 7c is applied to a set terminal of the flip-flop 7a through a delay circuit 7h.

Incidentally, when the output voltage Vb decreases on the occasion that the load Po is fixed, the feedback voltage FB of the DC-DC converter 3 increases in order to secure a predetermined DC output voltage Vo. Then, the feedback voltage FB exceeds the second threshold voltage Vref2 which is set based on the minimum value (bottom voltage Vb-min) of the output voltage Vb depending on the load Po as described above.

In this respect, when the second threshold voltage Vref2 is set based on the maximum value (peak voltage Vb-max) of the output voltage Vb, the second threshold voltage Vref2 to be compared with the feedback voltage FB increases in accordance with the decrease of the output voltage Vb. Accordingly, it is possible to prevent occurrence of such a disadvantage that the feedback voltage FB increasing with the decrease of the output voltage Vb exceeds the second threshold voltage Vref2. Therefore, only the increase of the feedback voltage FB caused by the increase of the load Po can be detected reliably.

The delay circuit 7h which delays the output of the comparator 7c for a fixed time Tdelay will be descried below. The delay circuit 7h has a capacitor Ct2 charged by a constant current source It2. When the output of the comparator 7c is [H], a switching element S2 provided in parallel with the capacitor Ct2 is off (shut off) so that the capacitor Ct2 is charged. When the output of the comparator 7c is [L], the switching element S2 is on (conductive) so that electric charge stored in the capacitor Ct2 is discharged through a resistor Rt2. A comparator 7i provided in the delay circuit 7h plays a role of resetting the flip-flop 7a when a charged voltage Vd2 of the capacitor Ct2 to be charged or discharged as described above exceeds a reference voltage Vth3. Incidentally, the aforementioned fixed time Tdelay is set, for example, to be about a half period of the AC voltage Vac. Specifically, when the AC voltage Vac is an AC voltage with 50 Hz, the fixed time Tdelay is set to be about 10 ms.

According to the delay circuit 7h configured thus, even when the feedback voltage FB temporarily exceeds the second threshold voltage Vref2 so that the output of the comparator 7c turns to [H], the flip-flop 7a is never reset unless this state continues for the fixed time Tdelay (about 10 ms). In other words, when the state in which the feedback voltage FB exceeds the second threshold voltage Vref2 continues for the fixed time Tdelay, this is detected as an increase of the load Po so that the flip-flop 7a is reset. Due to the resetting of the flip-flop 7a, the flip-flop 7e is set through the aforementioned delay circuit 7d so that the operation-enable signal EN is outputted.

Figure 2:
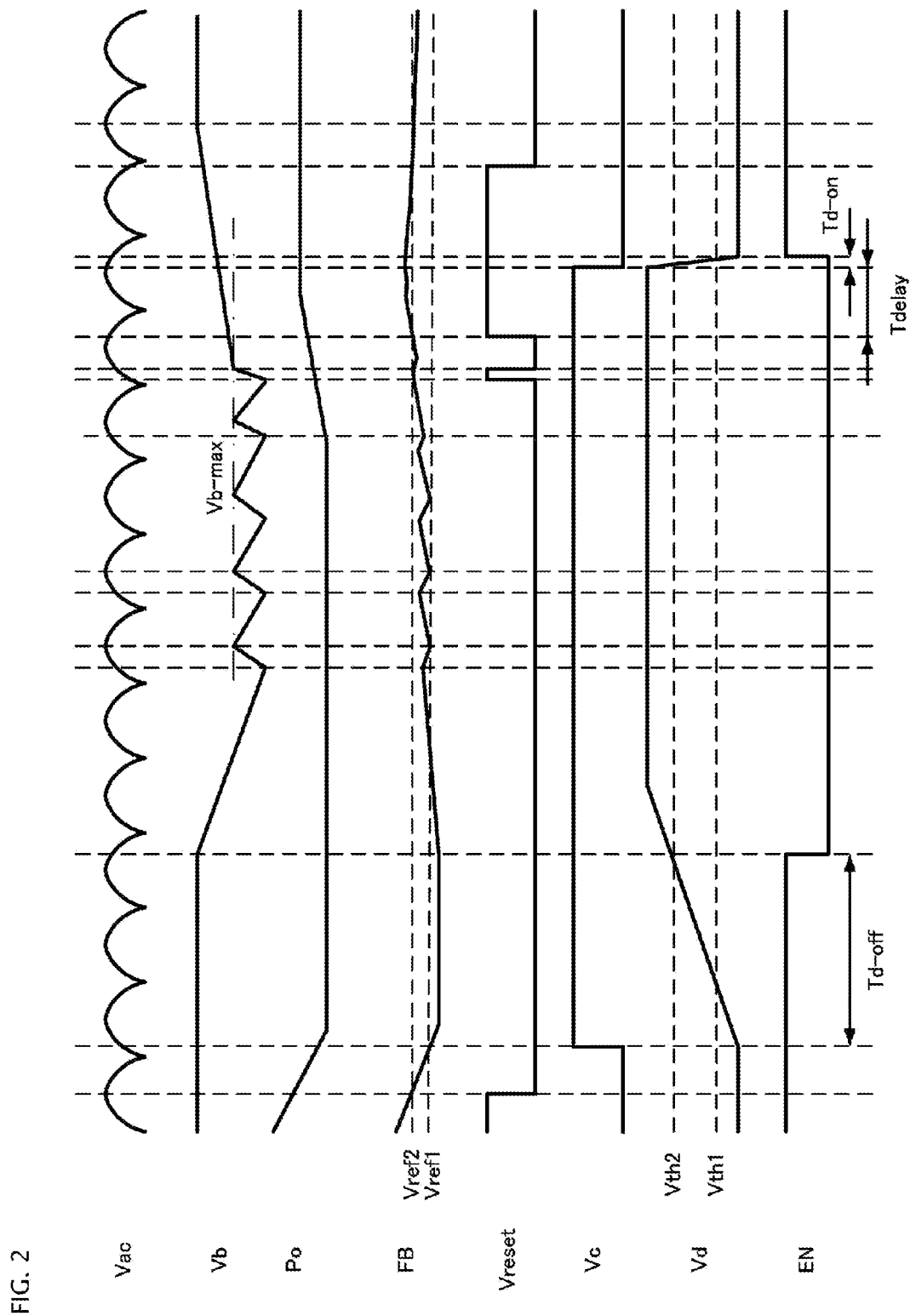
FIG. 2 is an operation waveform graph for explaining operation of the load state detecting circuit shown in FIG. 1 and effects thereof.

According to the switching power supply device 1 which is formed to include the load state detecting circuit 7 configured as described above, the load Po of the DC-DC converter 3 becomes light as in a waveform graph of operation of the load state detecting circuit 7 shown in FIG. 2. When the feedback voltage FB decreasing with the decrease of the load Po becomes lower than the first threshold voltage Vref1, the flip-flop 7a is set based on the output of comparator (light load detecting circuit) 7b. Then, the switching element S of the delay circuit 7d is turned off due to the setting of the flip-flop 7a so that the capacitor Ct is charged with charging characteristic determined based on the capacitance of the capacitor Ct and a constant current fed from the constant current source It. After the passage of a predetermined time Td-off until the charged voltage Vd of the capacitor Ct exceeds the second reference voltage Vth2, the flip-flop 7e is reset so that the operation-enable signal EN turns to [L] to thereby make control to stop operation of the power factor correction converter 2.

When the operation (working) of the power factor correction converter 2 is stopped in this manner, the output voltage Vb of the power factor correction converter 2 is reduced gradually and then settled down to a voltage determined based on the AC voltage Vac applied from the commercial power supply 5 as described above. The output voltage Vb of the power factor correction converter 2 on this occasion changes periodically in a cycle based on rectification of the AC voltage Vac and with a change width determined based on the size of the load Po and the capacitance of the output capacitor C1. The peak voltage Vb-max of the output voltage Vb on this occasion depends on the AC voltage Vac as described above and the bottom voltage Vb-min thereof depends on the size of the load Po. In the invention, the peak voltage Vb-max of such an output voltage Vb is detected so that the second threshold voltage Vref2 is set based on the detected peak voltage Vb-max.

On the other hand, when the load Po becomes heavy in an operation-stopped state of the aforementioned power factor correction converter 2, the feedback voltage FB in the DC-DC converter 3 increases with the increase of the load Po. When the feedback voltage FB exceeds the second threshold voltage Vref2 which is set based on the maximum value (peak voltage Vb-max) of the output voltage Vb as described above, the output of the comparator (normal load detecting circuit) 7c turns to [H]. When the state in which the output of the comparator 7c is [H] continues for a fixed time Tdelay defined by the delay circuit 7h, the flip-flop 7a is reset based on the output of the delay circuit 7h.

When the time for which the feedback voltage FB exceeds the second threshold voltage Vref2 is shorter than the fixed time Tdelay defined by the delay circuit 7h, the capacitor Ct2 of the delay circuit 7h is discharged at the point of time when the output of the comparator 7c returns to [L], so that a reset signal is not outputted from the delay circuit 7h to the flip-flop 7a. Accordingly, even when the feedback voltage FB exceeds the second threshold voltage Vref2 temporarily, the flip-flop 7a is never reset unless this state continues for the fixed time Tdelay.

When the flip-flop 7a is reset through the delay circuit 7h functioning thus, electric charge stored in the capacitor Ct of the delay circuit 7d begins to be discharged accordingly. After the passage of a discharging time Td-on until the charged voltage Vd of the capacitor Ct is lower than the reference voltage Vth1 due to the discharging of the capacitor Ct, the flip-flop 7e is set so that the operation-enable signal turns to [H]. As a result, operation of the power factor correction converter 2 is enabled so that operation of the power factor correction converter 2 restarts.

According to the load state detecting circuit 7 operating thus, because the second threshold voltage Vref2 set in the comparator 7c serving as a normal load detecting circuit is set based on the peak voltage Vb-max of the output voltage Vb of the power factor correction converter 2, only the increase of the feedback voltage FB caused by the increase of the load Po can be detected reliably even when the AC voltage Vac decreases.

In other words, even when the decrease of the output voltage Vb of the power factor correction converter 2 is caused by the decrease of the AC voltage Vac to thereby result in the increase of the feedback voltage FB in the DC-DC converter 3, the second threshold voltage Vref2 to be compared with the feedback voltage FB is set to be high in accordance with the decrease of the peak voltage Vb-max of the output voltage Vb so that the increase of the feedback voltage FB caused by the decrease of the AC voltage Vac is prevented from being detected as an increase of the load Po by mistake. Accordingly, even when the AC voltage Vac decreases, the change of the feedback voltage FB changing in accordance with the load Po can be grasped reliably so that the increase of the load Po particularly in the operation-stopped state of the power factor correction converter 2 can be detected reliably.

In the aforementioned embodiment, attention is paid to the change of the feedback voltage FB in the DC-DC converter 3 to determine the increase of the load Po. However, a time width Tonoff of an on/off drive cycle of the switching element Q2 in the DC-DC converter 3 also changes in accordance with the change of the load Po. Accordingly, attention may be paid to the time width Tonoff of the on/off drive cycle to determine the increase of the load Po in the operation-stopped state of the power factor correction converter 2. In this case, a periodic voltage Vsw proportional to the time width Tonoff of the on/off drive cycle may be generated so that the second threshold voltage Vref2 to be compared with the periodic voltage Vsw can be set based on the peak voltage Vb-max.

The time width Tonoff of the on/off drive cycle means a time width of a repetition cycle of turning on the switching element Q2 or a time width of a repetition cycle of turning off the switching element Q2. That is, when the DC-DC converter 3 is made of a quasi-resonant converter, bottom skip control is executed in such a manner that the switching element Q2 is turned on after the bottom of a drain voltage vibrating by resonance is detected a certain number of times after the switching element Q2 is turned off in order to suppress the upper limit of the switching frequency in the light load state. The time width Tonoff of the on/off drive cycle includes a time spent for such bottom skip control.

Figure 3:
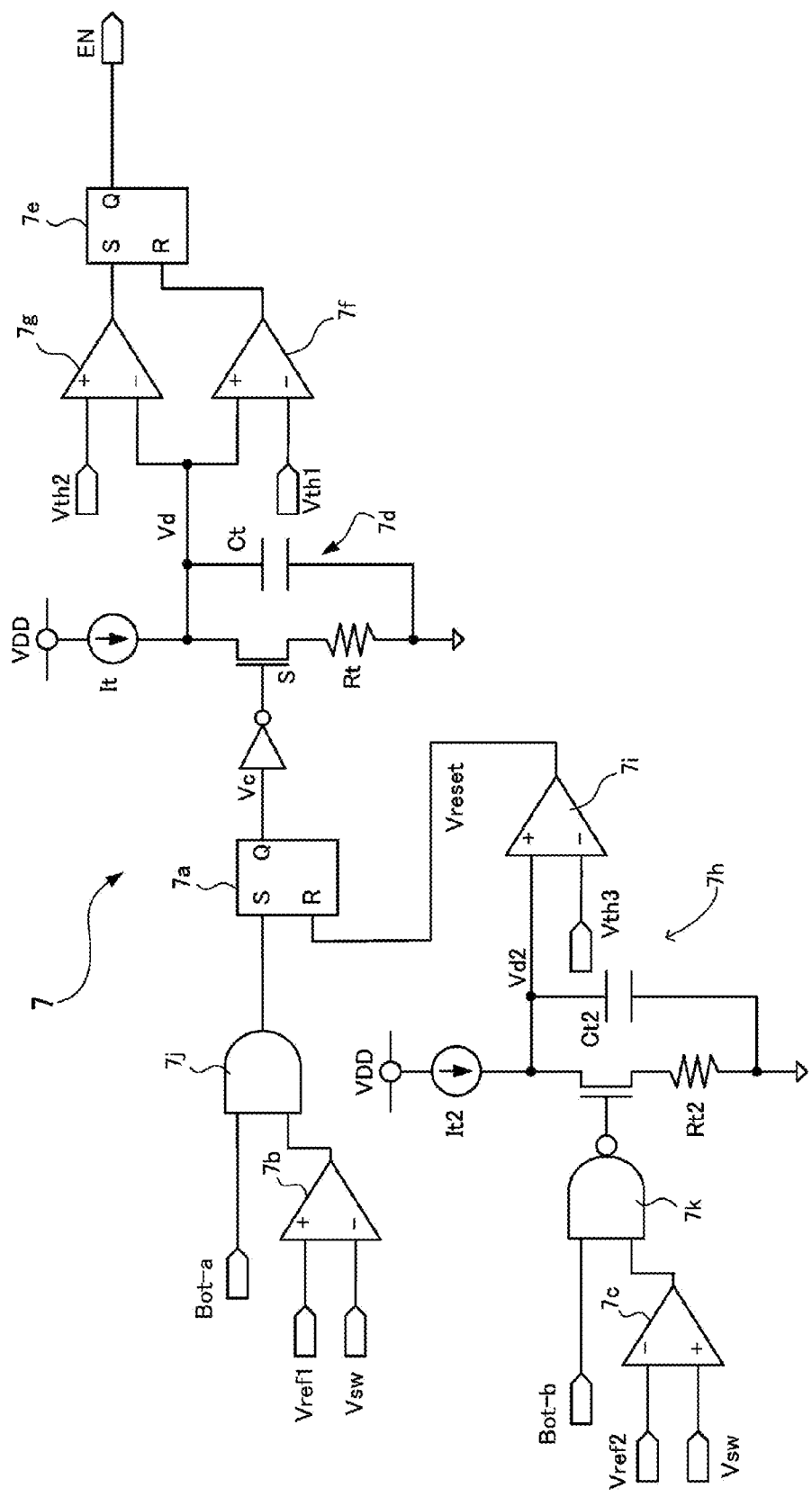
FIG. 3 is a diagram showing another example of configuration of the load state detecting circuit.

FIG. 3 shows an example of schematic configuration of the load state detecting circuit 7 configured to detect the change of the load Po based on the periodic voltage Vsw. That is, in this case, as shown in FIG. 3, configuration is made so that the comparator 7b compares the periodic voltage Vsw with the first threshold voltage Vref1 to detect a light load state to stop operation of the power factor correction converter 2, and in the operation-stopped (in the light load state) state of the power factor correction converter 2, the periodic voltage Vsw is compared with the second threshold voltage Vref2 to detect the increase of the load Po to output the operation-enable signal EN for enabling operation of the power factor correction converter 2.

Figure 6:
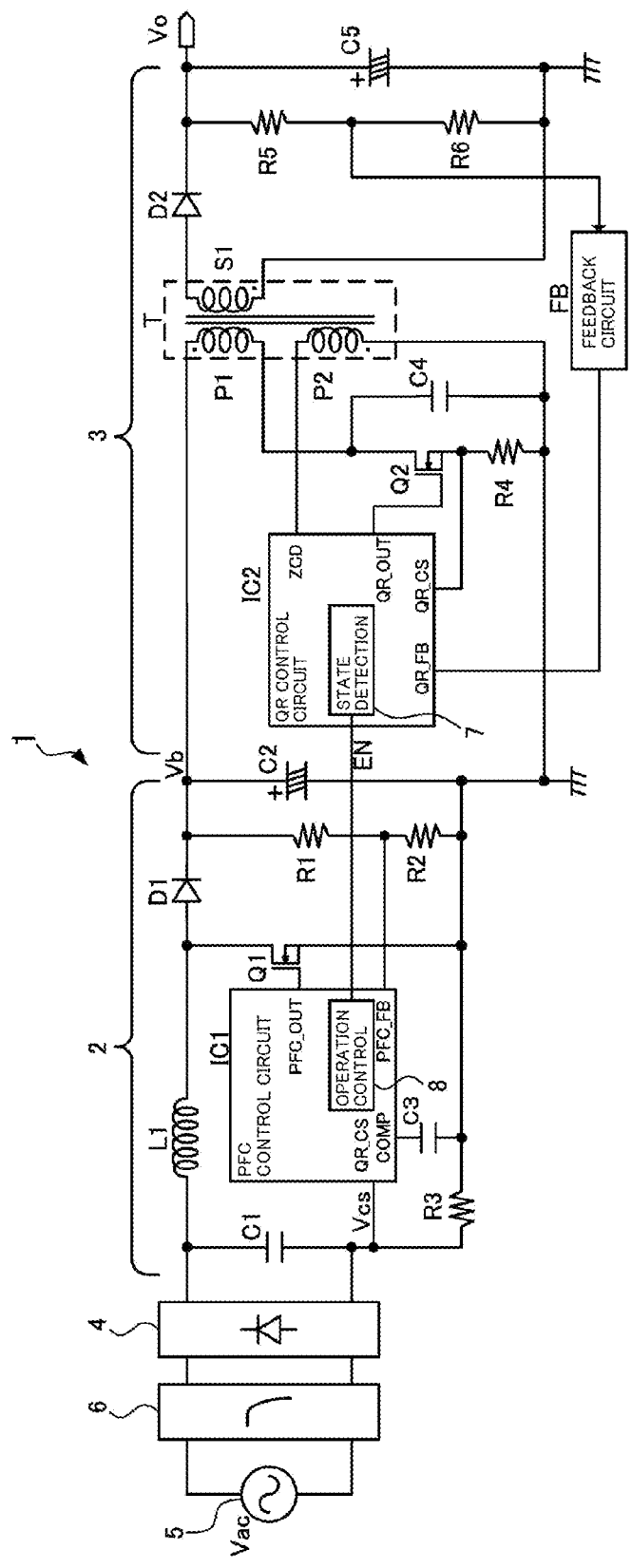
FIG. 6 is a diagram of schematic configuration of a switching power supply device equipped with a power factor correction converter and a DC-DC converter (quasi-resonant converter)

In FIG. 3, configuration is made so that the output of the comparator 7b is applied to a set terminal of the flip-flop 7a through an AND circuit 7j and the output of the comparator 7c is inputted to the delay circuit 7h through a NAND circuit 7k. When the DC-DC converter 3 is implemented as a quasi-resonant converter as shown in FIG. 6, the AND circuit 7j and the NAND circuit 7k play roles of gate-controlling the outputs of the comparators 7b and 7c by using bottom control signals Bot used for controlling turning-on timing of the switching element Q2 in the aforementioned bottom skip control in the quasi-resonant converter.

Incidentally, in the quasi-resonant converter, so-called bottom skip control is executed in such a manner that the number of times by which the drain voltage vibrating due to a resonance current after turning off of the switching element Q2 takes a bottom value as described above in order to limit the minimum value of the on/off drive cycle of the switching element Q2 in the light load state so that the switching element Q2 is turned on after the bottom value is detected a predetermined number of times in the light load state. Each of the bottom control signals Bot-a to Bot-f is a control signal which is used for the bottom skip control and which turns to [H] when it reaches the preset number of bottom skips.

For example, the number of bottom skips is set to be [0] or [1] in a heavy load state, [2] or [3] in a middle load state, and [4] to [10] in a light load state. The number of bottom skips [0] means that the turning-on timing of the switching element Q2 is controlled based on the first bottom detected after turning off of the switching element Q2, that is, without any bottom skip. The number of bottom skips [5] means that the turning-on timing of the switching element Q2 is controlled based on the next bottom detected after five bottoms skipped after turning off of the switching element Q2.

The bottom control signal Bot-b which turns to [H] when the DC-DC converter 3 is in the middle load state and the number of bottom skips is not larger than [2] is inputted to the NAND circuit 7k to turn the NAND circuit 7k active to output a signal indicating the light load state detected by the comparator 7c. That is, the NAND circuit 7k resets the flip-flop 7a when the load Po shifts from the light load state to the middle load state.

In addition, the bottom control signal Bot-a which turns to [H] when the DC-DC converter 3 is in the light load state and the number of bottom skips is not smaller than [4] is inputted to the AND circuit 7j to turn the AND circuit 7j active to output a signal indicating the light load state detected by the comparator 7b. That is, the AND circuit 7j sets the flip-flop 7a when the load Po shifts from the normal load state to the light load state.

In the load state detecting circuit 7 configured thus, determination is made based on comparison of the periodic voltage Vsw with the second threshold voltage Vref2 which is set based on the peak voltage Vb-max of the output voltage Vb of the power factor correction converter 2 so that the increase of the load Po is detected. In addition, the load state of the quasi-resonant converter (DC-DC converter 3) is determined by use of the bottom control signal Bot used for control of the turning-on timing of the switching element Q2 in the quasi-resonant converter.

Accordingly, in accordance with the load state detecting circuit 7 configured as described above, the change of the time width Tonoff of the on/off drive cycle of the switching element Q2 caused by the decrease of the AC voltage Vac, particularly, the increase of the periodic voltage Vsw proportional to the time width Tonoff of the on/off drive cycle is prevented from being detected as an increase of the load Po by mistake. Accordingly, the change of the periodic voltage Vsw changing in accordance with the load Po can be grasped reliably so that particularly the increase of the load Po in the operation-stopped state of the power factor correction converter 2 can be detected reliably.

Accordingly, in accordance with the switching power supply device 1 equipped with the thus configured load state detecting circuit 7, operation of the power factor correction converter 2 can be stopped in the light load state and the operation of the power factor correction converter 2 can be restarted when the load Po increases in the operation-stopped state of the power factor correction converter 2. Therefore, operation of the power factor correction converter 2 can be controlled properly in accordance with the load state even when the AC voltage Vac decreases, so that conversion efficiency of the power factor correction converter 2 can be enhanced satisfactorily.

Figure 4:
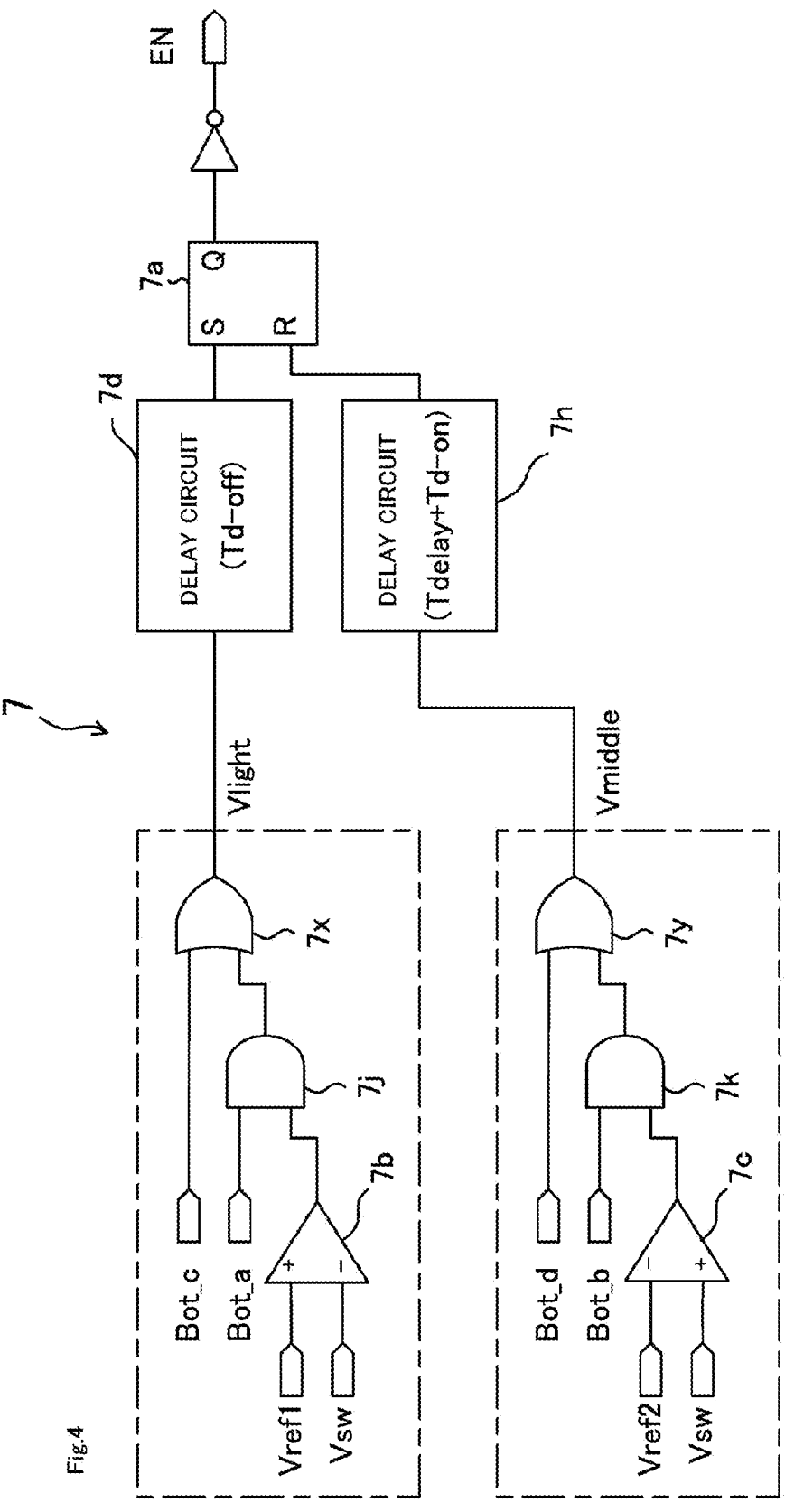
FIG. 4 is a diagram showing a further example of configuration of the load state detecting circuit.

FIG. 4 shows another example of configuration of the load state detecting circuit 7. The load state detecting circuit 7 shown in FIG. 4 is configured so that the delay circuit 7d is provided prior to the flip-flop 7a to obtain an operation-enable signal EN as an output of the flip-flop 7a. In FIG. 4, an OR circuit 7x to which a bottom control signal Bot-c relevant to the aforementioned bottom control signal Bot-a is inputted and which sets the flip-flop 7a independently of the aforementioned light load detection made by the comparator 7b is provided as a circuit for detecting the light load state. In addition, an OR circuit 7y to which a bottom control signal Bot-d relevant to the aforementioned bottom control signal Bot-b is inputted and which resets the flip-flop 7a independently of the aforementioned normal load detection made by the comparator 7c is provided as a circuit for detecting the normal load state.

When the bottom control signal Bot-c which turns to [H] when the number of bottom skips is not smaller than [8] is inputted to the OR circuit 7x, the OR circuit 7x forcedly sets the flip-flop 7a independently of the aforementioned detection of shift from the middle load state to the light load state by the comparator 7b. That is, when the power factor correction converter 2 is operated in the light load state in which the number of bottom skips is not smaller than [8], the loss in the power factor correction converter 2 rather increases to make it impossible to achieve reduction of conversion efficiency. Accordingly, the OR circuit 7x forcedly stops outputting of the operation-enable signal EN to thereby play a role of disabling operation of the power factor correction converter 2.

When the bottom control signal Bot-d which turns to [H] when the number of bottom skips is not larger than [1] is inputted to the OR circuit 7y, the OR circuit 7y plays a role of forcedly resetting the flip-flop 7a independently of the aforementioned detection of shift from the light load state to the normal load state by the comparator 7c. As a result, the operation-enable signal EN is outputted without any time delay so that operation of the power factor correction converter 2 can restart rapidly. Accordingly, even when the load state detecting circuit 7 is configured as shown in FIG. 4, the same effect as that in the case where the load state detecting circuit 7 shown in each of FIGS. 1 and 3 is used can be obtained.

Figure 5:
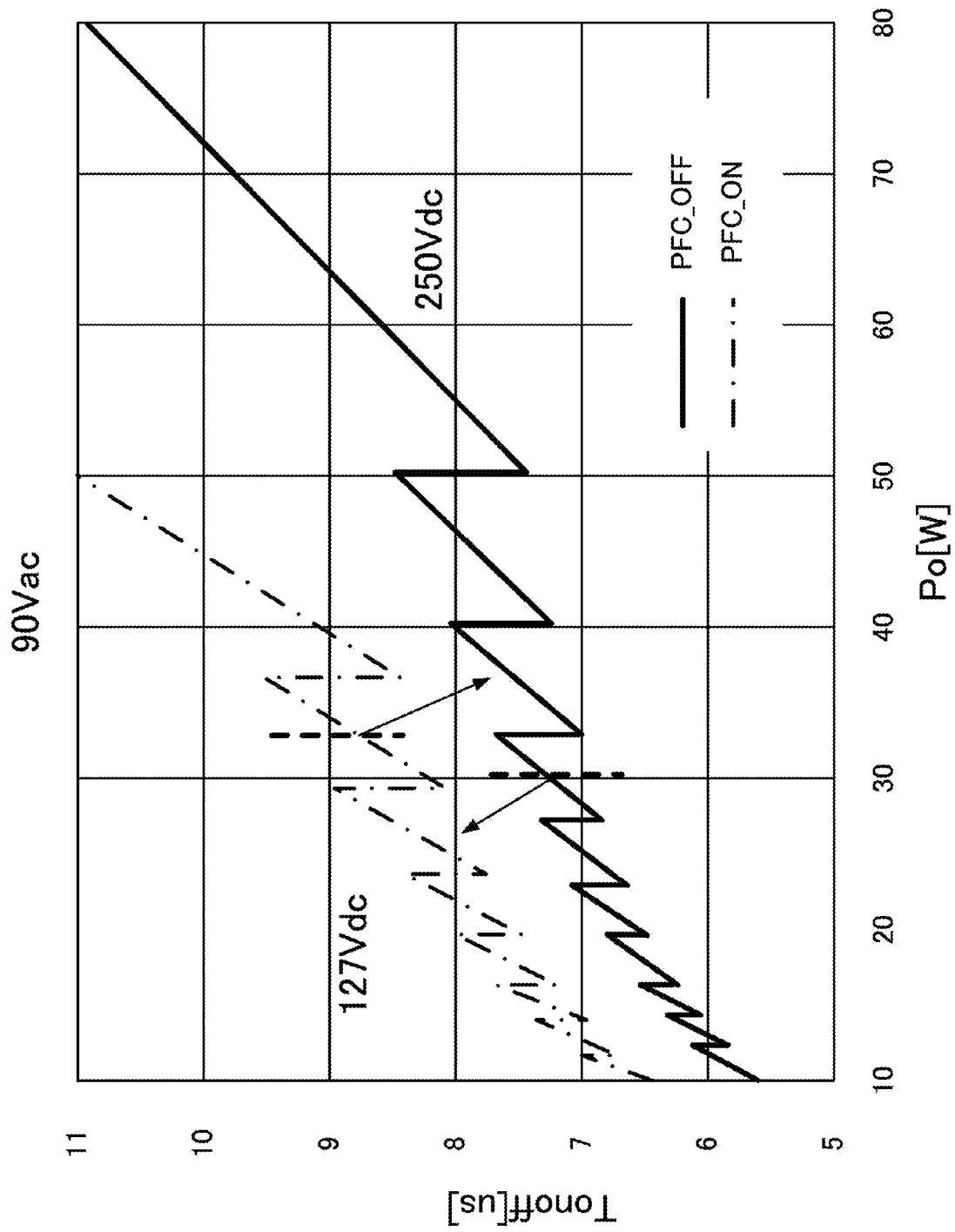
FIG. 5 is a graph showing the relation between a time width Tonoff of an on/off drive cycle of a switching element Q2 in a quasi-resonant converter and a load Po.

FIG. 5 shows the relation between the load Po and the time width Tonoff of the on/off drive cycle changing in accordance with the size of the load Po of the switching element Q2 in the DC-DC converter 3 which generates a predetermined DC output voltage Vo by switching the output voltage Vb of the power factor correction converter 2 in the switching power supply device 1 equipped with the power factor correction converter 2 to which an AC voltage 90 Vac is inputted and which obtains 250 Vdc as the output voltage Vb.

In FIG. 5, the solid line designates characteristic of the DC-DC converter 3 to which a DC voltage of 250 Vdc is inputted as the output voltage Vb of the power factor correction converter 2 when the power factor correction converter 2 is operating. The one-dot chain line designates characteristic of the DC-DC converter 3 to which a DC voltage Vb of 127 Vdc obtained by rectifying and smoothening the AD voltage of 90 Vac is inputted as the output voltage Vb of the power factor correction converter 2 when operation of the power factor correction converter 2 is stopped.

As shown in FIG. 5, when the time width Tonoff of the on/off drive cycle of the switching element Q2 is determined under the control of the aforementioned load state detecting circuit 7 to control operation of the power factor correction converter 2 to be stopped and restarted based on the determination result, the width of power hysteresis between the operating state and the operation-stopped state of the power factor correction converter 2 can be secured sufficiently to control operation of the power factor correction converter 2 stably even if the AC voltage is as low as 90 Vac.

Specifically, control is made as follows. That is, when the time width between on and off of the switching element Q2 decreases, for example, to be not larger than 7.2 µs due to the reduction of the load Po in the operating state of the power factor correction converter 2, operation of the power factor correction converter 2 is stopped. When the time width between on and off of the switching element Q2 increases, for example, to be not smaller than 8.7 µs due to the increase of the load Po in the operation-stopped state of the power factor correction converter 2, operation of the power factor correction converter 2 is restarted. When control is made in this manner, the width of the power hysteresis can be secured sufficiently even if the AC voltage is as low as 90 Vac. Accordingly, operation of the power factor correction converter 2 can be controlled to turn on/off stably.

As described above regarding the load state detecting circuit 7 of the switching power supply device according to the invention, attention is paid to the fact that the maximum value (peak voltage Vb-max) of the output voltage Vb of the power factor correction converter 2 in the operation-stopped state of the power factor correction converter 2 changes in accordance with the AC voltage Vac which is inputted to the power factor correction converter 2 in the invention, so that a threshold (second threshold voltage Vref2) for enabling operation of the power factor correction converter 2 is set based on the maximum value (peak voltage Vb-max) of the output voltage Vb.

Therefore, according to the switching power supply device according to some embodiments of the invention, even when the voltage Vac of the AC power fed to the switching power supply device 1 decreases so that the output voltage Vb of the power factor correction converter 2 decreases accordingly, the increase of the load Po of the DC-DC converter 3 can be detected reliably. Accordingly, the increase of the load Po in the operation-stopped state of the power factor correction converter 2 can be detected reliably regardless of the decrease of the input voltage Vac so that operation (working) of the power factor correction converter 2 can be restarted. Therefore, the switching power supply device 1 can be operated with high efficiency while the loss in the power factor correction converter 2 is suppressed as sufficiently as possible.

The invention is not limited to the aforementioned embodiments. For example, it will go well if the fixed time (delay time) Tdelay set in the aforementioned delay circuit 7h is set as a time not shorter than a half period of the aforementioned AC voltage Vac. It will go well if the second threshold voltage Vref2 set in accordance with the change of the peak voltage Vb-max of the output voltage Vb is set in accordance with the minimum voltage up to which the decrease of the AC voltage Vac can be allowed, and the change width of the output voltage Vb caused by the decrease of the AC voltage Vac, that is, in accordance with the relation with the bottom voltage Vb-min of the output voltage Vb.

Embodiments of the invention may be applied likewise even when another converter such as a multi-oscillated current resonant converter than the aforementioned quasi-resonant converter is used as the DC-DC converter 3. In addition, the invention may be modified and carried out without departing from the gist of the invention.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-157052, filed on Jul. 13, 2012. The disclosure of the priority application, in its entirety, including the drawings, claims, and the specification thereof, is incorporated herein by reference.

What is claimed is:

1. A switching power supply device comprising:
a power factor correction converter which obtains a DC voltage by switching an input AC voltage;

a DC-DC converter which obtains a predetermined DC output voltage by switching an output voltage of the power factor correction converter; and a load state detecting circuit which outputs an operation-enable signal for the power factor correction converter in accordance with a load state of the DC-DC converter to thereby enable or stop operation of the power factor correction converter; wherein:

the load state detecting circuit is configured so that a threshold for determining the size of the load of the DC-DC converter is set in the load state detecting circuit based on a predetermined maximum value of the output voltage of the power factor correction converter in an operation-stopped state of the power factor correction converter, so that the load state detecting circuit outputs the operation-enable signal when a signal indicating the size of the load of the DC-DC converter exceeds the threshold, the threshold is set as a threshold voltage to be compared with a feedback voltage used for controlling the DC output voltage in the DC-DC converter; and the load state detecting circuit includes:

a flip-flop which outputs the operation-enable signal at a reset time;

a light load detecting circuit which sets the flip-flop when the feedback voltage is lower than a preset first threshold voltage; and a normal load detecting circuit which resets the flip-flop when a fixed time has passed after the feedback voltage exceeds a second threshold voltage which is higher than the first threshold voltage and which is set based on the maximum value of the output voltage of the power factor correction converter.

2. The switching power supply device according to claim 1, wherein: the load state detecting circuit includes a voltage detecting unit which detects the maximum value of the output voltage of the power factor correction converter in the operation-stopped state of the power factor correction converter so that the threshold for determining the size of the load of the DC-DC converter is set in the load state detecting circuit in accordance with the predetermined maximum value of the output voltage detected by the voltage detecting unit.

3. A switching power supply device comprising:

a power factor correction converter which obtains a DC voltage by switching an input AC voltage;

a DC-DC converter which obtains a predetermined DC output voltage by switching an output voltage of the power factor correction converter; and a load state detecting circuit which outputs an operation-enable signal for the power factor correction converter in accordance with a load state of the DC-DC converter to thereby enable or stop operation of the power factor correction converter; wherein:

the load state detecting circuit is configured so that a threshold for determining the size of the load of the DC-DC converter is set in the load state detecting circuit based on a predetermined maximum value of the output voltage of the power factor correction converter in an operation-stopped state of the power factor correction converter, so that the load state detecting circuit outputs the operation-enable signal when a signal indicating the size of the load of the DC-DC converter exceeds the threshold, the threshold is set as a threshold voltage to be compared with a periodic voltage proportional to a time width of an on/off drive cycle of a switching element in the DC-DC converter; and the load state detecting circuit includes:

a flip-flop which outputs the operation-enable signal at a reset time;

a light load detecting circuit which sets the flip-flop when the periodic voltage is lower than a preset first threshold voltage; and a normal load detecting circuit which resets the flip-flop when a fixed time has passed after the periodic voltage exceeds a second threshold voltage which is higher than the first threshold voltage and which is set based on the maximum value of the output voltage of the power factor correction converter.

4. The switching power supply device according to claim 1, wherein: the fixed time set in the normal load detecting circuit is a time substantially equal to or longer than a half period of the AC power.

5. The switching power supply device according to claim 3, wherein: the fixed time set in the normal load detecting circuit is a time substantially equal to or longer than a half period of the AC power.

6. The switching power supply device according to claim 1, wherein the DC-DC converter is made of a quasi-resonant converter.

* * * * *